No. 639,156. Patented Dec. 12, 1899.
A. DUCASBLE.
ELASTIC TIRE FOR AUTOCARS.
(Application filed June 7, 1899.)
(No Model.)
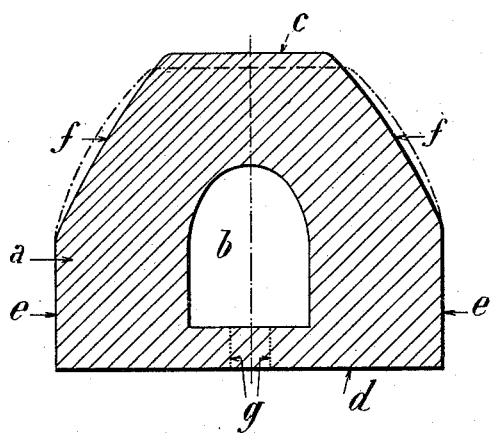

UNITED STATES PATENT OFFICE.

ALFRED DUCASBLE, OF ASNIÈRES, FRANCE, ASSIGNOR, BY MESNE ASSIGNMENTS, TO CLAYTON E. PLATT, TRUSTEE, OF PHILADELPHIA, PENNSYLVANIA.

ELASTIC TIRE FOR AUTOCARS.

SPECIFICATION forming part of Letters Patent No. 639,156, dated December 12, 1899.

Application filed June 7, 1899. Serial No. 719,688. (No model.)

*To all whom it may concern:*

Be it known that I, ALFRED DUCASBLE, a citizen of the Republic of France, residing at Asnières, (Seine,) France, have invented a certain new and useful Improvement in Elastic Tires for Autocars and other Vehicles, (for which I have secured Letters Patent in France, dated December 6, 1898, No. 283,746, and in Germany a petty patent, dated December 19, 1898, No. 108,055, in the name of Rudolf Schmidt;) and I do hereby declare that the following is a full, clear, and exact specification of the same.

The present invention has for its object a hollow tire for autocar and other vehicle wheels. It is so constructed that the tread thereof always has an invariable width whatever may be the weight which the tire may have to carry, that the tire offers a maximum resistance for a minimum volume and weight, and that it offers great resistance against side slipping.

The annexed drawing is a cross-section of a hollow tire made according to my invention.

This tire consists, as shown, of a band or ring $a$, made of rubber or other suitable material, having an interior chamber or space $b$ of any suitable shape. The section of the tire assumes, as shown, an irregular hexagonal form—that is to say, the tread $c$, which comes in contact with the ground, is flat and is of a width less than the base $d$, which rests upon the rim (not shown) of the wheel. From the base $d$ project, perpendicularly thereto, the vertical sides $e$ $e$, which are connected with the tread $c$ by two oblique parts or abutments $ff$.

The inclination of the abutments $ff$ with regard to the vertical line is so calculated as to give a maximum resistance for a minimum of volume and weight of the tire. The said inclination will, besides, have the great effect of presenting a great resistance against side slipping.

It will readily be seen upon examining the drawing that the tread $c$—that is to say, the friction-face—will, furthermore, retain an invariable width whatever may be the weight the tire may have to carry, as the bending of the tire taking place on the lateral oblique parts $ff$ they will under pressure undergo a swelling, as indicated in dotted lines in the drawing, but without coming in contact with the ground.

It will also be understood that the tire may be closed all around the inner space $b$, as shown in full lines, or that it may be open along its inner periphery at the middle of the base $d$, as indicated by $g$ in dotted lines.

I claim—

An elastic tire for vehicles having parallel horizontal faces $c$ $d$ constituting the tread and base of the tire, said face $c$ of less transverse area than said base, parallel vertical sides $e$ and sides $f$ converging from said sides $e$ to the tread, said tire provided with a circular arched chamber $b$ nearer to the base than the tread, substantially as and for the purpose set forth.

In witness whereof I have hereunto set my hand, this 27th day of April, 1899, in the presence of two subscribing witnesses.

ALFRED DUCASBLE.

Witnesses:
D. HORACE BRANDON,
EDWARD P. MACLEAN.